Feb. 11, 1947.  F. R. HIGLEY  2,415,560
RIVET WITH FLUID EXPANDER THEREIN
Filed Sept. 30, 1943

INVENTOR.
FRANK R. HIGLEY
BY Hasegood & Van Horn
ATTORNEYS

Patented Feb. 11, 1947

2,415,560

UNITED STATES PATENT OFFICE 2,415,560

RIVET WITH FLUID EXPANDER THEREIN

Frank R. Higley, Shaker Heights, Ohio, assignor to The Bryant Heater Company, Cleveland, Ohio, a corporation of Ohio Application September 30, 1943, Serial No. 504,415

1 Claim. (Cl. 85—40)

My invention relates to rivets of the fluid expansion type and more particularly to a rivet in which pressures may be generated internally of the rivet through the application of an initial fluid pressure and a mechanical pressure.

The invention further contemplates the new and improved method of binding a rivet of this type.

An important object of the invention is to exert in a rivet of the fluid expansion type an initial internally generated fluid pressure outwardly of the rivet effective to expand the rivet and also to exert a cooperating pressure along the rivet.

Another object of the invention is to bind a rivet of the above mentioned type by the application of a pressure consisting of an initial fluid pressure and a cooperating mechanical pressure acting internally of the rivet.

A further object is the provision of means for binding a rivet of the fluid expansion type by the application of an initial fluid pressure, in which the fluid pressure starts effectively greater and the applied mechanical pressure ends effectively greater.

It is also an object of the invention to provide a simple and inexpensive rivet construction by which the foregoing objects may be carried out.

Other objects and advantages of the invention will become more apparent from the following description of an embodiment thereof, reference being made to the accompanying drawing in which like reference characters are employed to designate like parts throughout the same.

Figure 1:
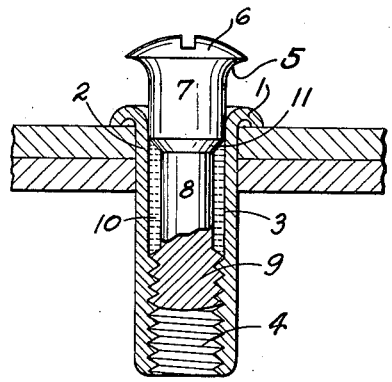
Figure 1 is a vertical section through a rivet embodying my invention, the inner member or actuator being shown in elevation. In this view the rivet is shown inserted into an opening in a member to which the rivet is to be bound.

In carrying out the present invention, as illustrated in the embodiment shown in the accompanying drawing, the outer member or rivet or expansion bolt proper comprises a head 1 and a shank 2, the head and shank having a bore for receiving a relatively movable actuator therein. The bore of the rivet comprises an upper portion 3 having smooth cylindrical side walls and a lower threaded portion 4, constituting a bore, of less pitch diameter than the bore 3.

A single inner member or actuator 5 having a tool-receiving head at 6 is provided with a portion 7 in the region of the head which slidably and rotatably engages the walls of the bore 3 sufficiently close to seal the same against leakage of the fluid from the chamber formed between the actuator and the rivet, yet permitting relative turning and sliding movement in the bore.

A stem or intermediate portion 8 of lesser diameter than that of the portion 7 extends downwardly therefrom and terminates in a threaded shank end 9 engageable with the threads in the shank end of the rivet outer member.

It will be seen that the stem 8 is spaced from the inner side walls of the rivet and provides a cylindrical fluid chamber therebetween as indicated at 10, so that upon a relative downward movement of the actuator 5 the lower wall 11 of the enlarged portion 7 of the actuator will exert a pressure upon the fluid in the chamber 10. This pressure is transmitted radially through the fluid to expand or bulge the side walls of the rivet shank outwardly as shown in Figure 2.

By providing a stepped bore or fluid chamber as described above, the fluid pressure generated internally of the rivet as the actuator is turned downwardly from the position shown in Figure 1 is very great, being, for the turning force exerted, proportional to the difference in areas at the head and shank end bearings. This pressure is effective to expand the walls outwardly as shown in Figure 2.

Figure 2:
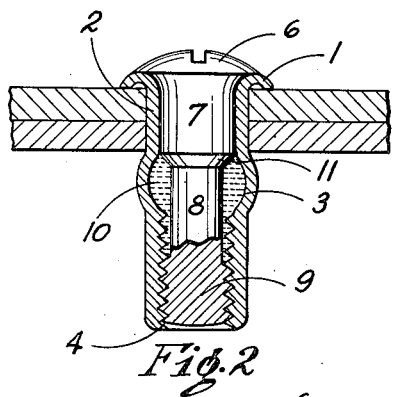
Figure 2 is a view similar to Figure 1 and illustrates the effect upon the rivet of the application of an initial differential fluid pressure, generated internally of the rivet; and, Figure 3 shows the same rivet effectively bound to its supporting member as a result of the application of an applied cooperating mechanical pressure along the rivet.
Figure 3:
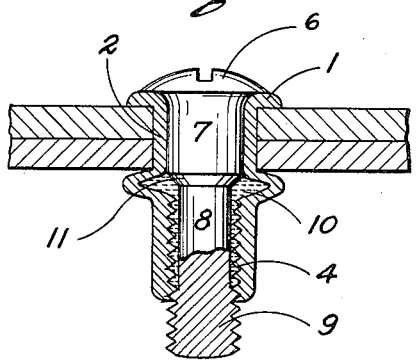

As the actuator reaches the position shown in Figure 2, the under surface of the head 6 will bear against the flange or rim of the rivet 1. Continued rotation of the actuator in the same direction by means of a tool or the like engaging in the slotted head thereof, will cause a longitudinal mechanical pressure to be exerted in compression along the rivet or outer member to further collapse its expanded portion and to bind it tightly against the article carrying the rivet. In this respect, it should be noted that the application of the mechanical force begins after the bulging by fluid pressure, and effectively increases as the actuator is further rotated in the same direction against the rim since the state of side wall collapse is advanced.

I claim:

Rivet means of the class described comprising, an outer member generally tubular and having head and shank portions, and an inner member having a tool-receiving head rotatably and snugly fitting within the head end of said outer member with flange means seatable thereagainst, a shank portion in threaded relation within the shank portion of said outer member and an intermediate portion having clearance from the corresponding portion of said outer member to provide a chamber, the pitch diameter of said threadedly related shank portions being less than the diameter at said rotatable fit, and a substantially non-compressible fluid filling said chamber.

FRANK R. HIGLEY.

REFERENCES CITED

The following references are of record in the file of this patent:

UNITED STATES PATENTS

| Number | Name | Date |
| --- | --- | --- |
| 2,045,126 | Deems | June 23, 1936 |
| 2,213,818 | Krause | Sept. 3, 1940 |
| 1,646,431 | Tomkinson | Oct. 25, 1927 |
| 1,921,794 | Tomkinson | Aug. 8, 1933 |
| 1,945,480 | Deems | Jan. 30, 1934 |
| 2,370,776 | Carlson | Mar. 6, 1945 |
| 2,324,142 | Eklund | July 13, 1943 |